(12) United States Patent
Yu

(10) Patent No.: US 6,526,680 B1
(45) Date of Patent: Mar. 4, 2003

(54) ILLUMINATED LICENSE PLATE HOLDER

(75) Inventor: David Yu, New York, NY (US)

(73) Assignee: Electra Accessories Inc., Cranbury, NJ (US)

(*) Notice: Subject to any disclaimer, the term of this patent is extended or adjusted under 35 U.S.C. 154(b) by 0 days.

(21) Appl. No.: 10/052,881

(22) Filed: Jan. 23, 2002

(51) Int. Cl.[7] .............................................. G09F 13/02
(52) U.S. Cl. ............................ 40/204; 40/209; 362/497
(58) Field of Search ................... 40/204, 209; 362/497, 362/499

(56) References Cited

U.S. PATENT DOCUMENTS

| | | | |
|---|---|---|---|
| 1,851,825 A | * 3/1932 | Frizner | ...................... 40/204 |
| 4,857,890 A | 8/1989 | Solow | |
| 5,255,166 A | * 10/1993 | Gonzalez | ...................... 40/204 |
| 5,408,772 A | * 4/1995 | Pettyjohn | ...................... 40/204 |
| 6,027,235 A | * 2/2000 | Chen | ........................... 362/497 |
| 6,276,822 B1 | 8/2001 | Bedrosian | |

* cited by examiner

Primary Examiner—Gary Hoge
(74) Attorney, Agent, or Firm—Alvin S. Blum

(57) ABSTRACT

A license plate holder for use on a vehicle has a frame that holds and displays a vehicle license plate on the vehicle. A plurality of red light emitting diodes (LEDs) is mounted around the perimeter of the frame. They are connected to the brake light circuit of the vehicle to light up when the brakes are applied. A lesser number of non-red LEDs are also disposed around the perimeter of the frame. These are connected to the running light circuit of the vehicle. They may be multi-colored or of a single color such as blue or green.

4 Claims, 3 Drawing Sheets

ILLUMINATED LICENSE PLATE HOLDER

BACKGROUND OF THE INVENTION

This invention relates to vehicle license plate holders, and more particularly to such holders that are provided with a plurality of LED lights around their perimeters.

DESCRIPTION OF THE PRIOR ART

U.S. Pat. No. 4,857,890 issued Aug. 15, 1989 to Solow teaches a safety rear license plate holder that has a string of lights disposed around the perimeter. These lights are connected to full vehicle electric voltage when the brake lights are energized. When the running lights are on, these same perimeter lights are energized from the vehicle voltage through a dropping resistor so as to emit less light. This indicates to a following vehicle when the brakes are being applied. It may not be very evident to the following vehicle that the brakes have been applied when the lights get brighter.

SUMMARY OF THE INVENTION

It is accordingly an object of the invention to provide an improved license plate holder of the invention that provides a plurality of red light emitting diodes (LEDs) disposed around the perimeter that light up only when the brakes are applied so as to be clearly seen. In addition, a lesser number of LEDs of a non-red color are also distributed about the perimeter for ornamentation. These non-red lights are connected so as to be illuminated when the running lights are on. A preferred color of these lights is blue. The LEDs have advantages in that these are longer lasting than filament bulbs, with a faster response time, when the brakes are applied.

DETAILED DESCRIPTION OF PREFERRED EMBODIMENTS

Figure 1:
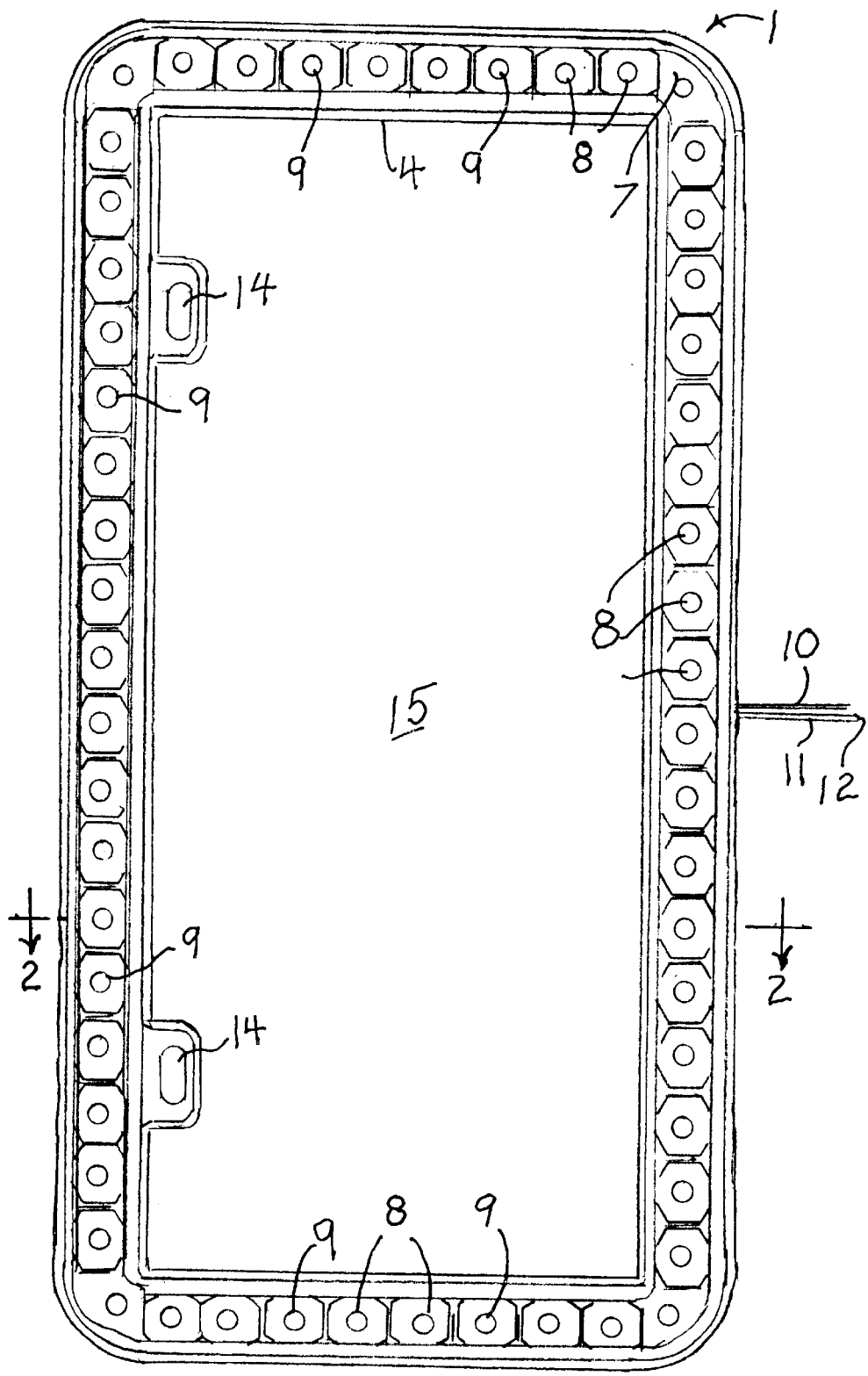
FIG. 1 is a front elevation view of the invention.
Figure 2:
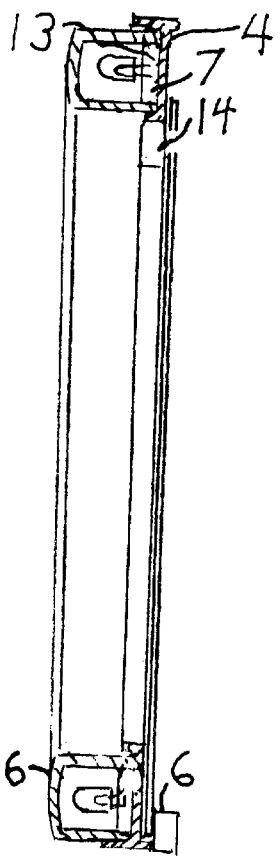
FIG. 2 is a sectional view, taken on line 2—2 of FIG. 1.
Figure 4:
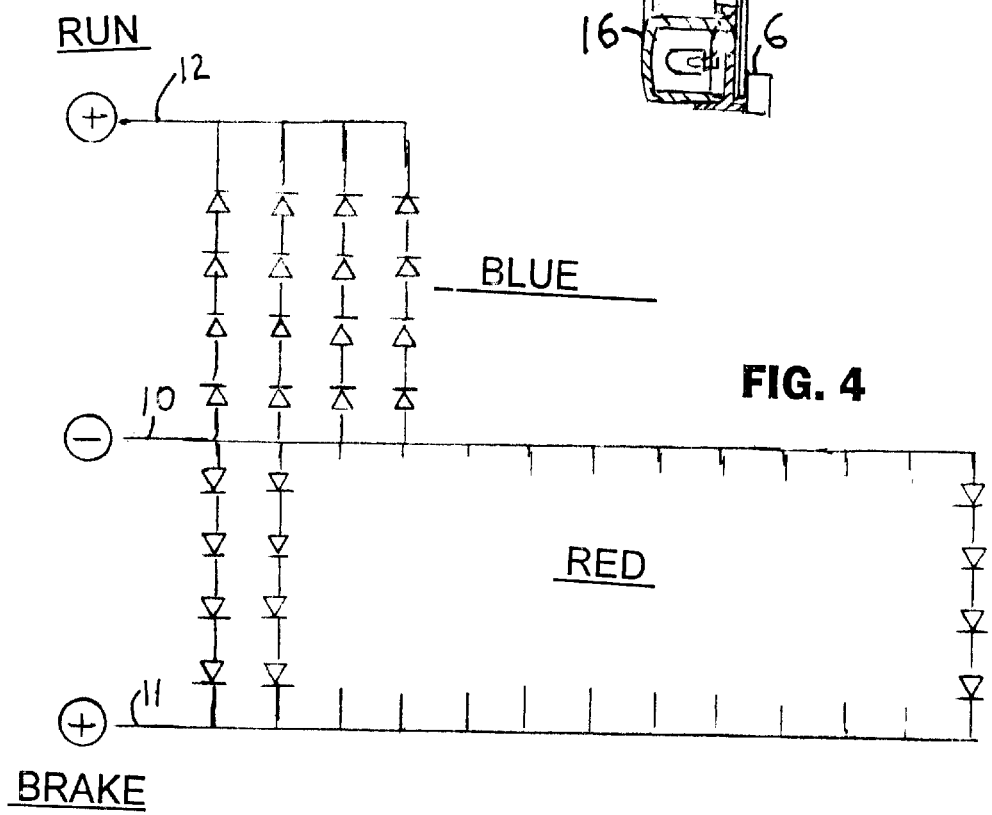
FIG. 4 is a schematic drawing of the electronics of the invention.
Figure 3:
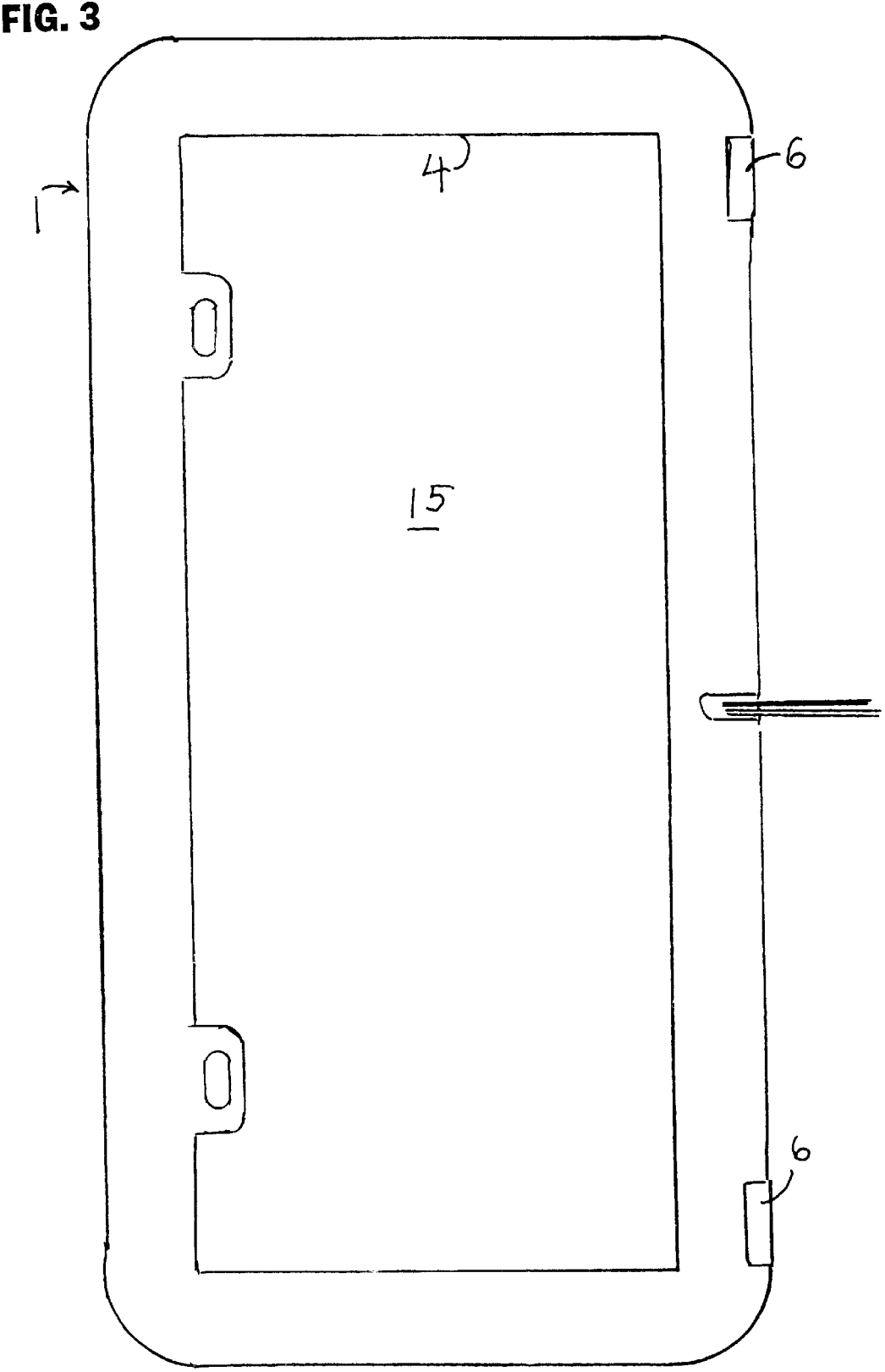
FIG. 3 is a rear elevation view of the invention.

Referring now to the drawings, a license plate holder 1 of the invention holds a license plate 5 between a pair of bolt receiving apertures 14 and a pair of projecting tabs 6 on a frame member 4. The frame member 4 defines an opening 15 for displaying the license plate in a legally required manner. The apertures 14 also permit the license plate 5 and holder 1 to be mounted on the vehicle in the conventional manner. A recess 7 in the face of the frame runs all the way around the perimeter. Within the recess are mounted a first plurality of LEDs 8, and a second plurality of LEDs 9. The first plurality of LEDs 8 emit red light, and the second plurality of LEDs 9 emit light that is not red. A reflective metallized base strip 13 beneath the diodes reflects light out the clear plastic U-shaped lens 16 that sealingly encloses and protects the diodes. The LEDs 9 may all emit light of one color such as blue or green, or they may emit a variety of colors, for ornamental effect as desired. There are forty-eight LEDs in the first plurality of light emitting diodes 8, and eight LEDs in second plurality of light emitting diodes 9. A common ground or negative wire 10 connects to the ground or negative on the vehicle. A wire 11 connects to the brake light circuit. A wire 12 connects to the running light circuit. Only when the brakes are applied, the red LEDs light up. When the running lights are on, the non-red lights are lit. The LEDs may be connected as shown in series/parallel to supply ¼ of the 12+ volts of the vehicle to each diode. The relative numbers in each plurality may vary. It is desirable to have many more in the first plurality to enhance the notice to a following driver that the brakes have been applied. By only illuminating the red lights when the brakes are applied, there is less confusion to a following driver. Because light emitting diodes have a much faster response time than the incandescent bulbs in the common brake lights, these offer a safety enhancement by lighting faster.

The above disclosed invention has a number of particular features which should preferably be employed in combination, although each is useful separately without departure from the scope of the invention. While I have shown and described the preferred embodiments of my invention, It will be understood that the invention may be embodied otherwise than herein specifically illustrated or described, and that certain changes in form and arrangement of parts and the specific manner of practicing the invention may be made within the underlying idea or principles of the invention.

What is claimed is:

1. A license plate holder for use on a vehicle having a brake light circuit and a running light circuit, the license plate holder comprising:

a) a flame member defining an opening for displaying a license plate;

b) holder means for mounting the license plate to the frame member;

c) a first plurality of red light emitting diodes disposed about the perimeter of the frame member;

d) a second plurality of non-red light emitting diodes disposed about the perimeter of the frame member, the second plurality being less than the first plurality;

e) first connecting means for connecting the first plurality to the brake circuit to power the red diodes only when the brakes are applied; and f) second connecting means for connecting the second plurality to the running light circuit to power the non-red diodes when the running lights are on.

2. The holder according to claim 1 in which the second plurality emit blue light.

3. The holder according to claim 1 in which the second plurality emit green light.

4. The holder according to claim 1 in which the second plurality emit light of several different colors.

* * * * *